Oct. 24, 1933.                F. C. WAPPLER                  1,932,258
                            SURGICAL ELECTRODE
                           Filed Sept. 2, 1931

INVENTOR
*Frederick Charles Wappler*
BY
*Frederick Breitenfeld*
ATTORNEY

Patented Oct. 24, 1933

1,932,258

UNITED STATES PATENT OFFICE 1,932,258

SURGICAL ELECTRODE

Frederick Charles Wappler, New York, N. Y.

Application September 2, 1931. Serial No. 560,683

1 Claim. (Cl. 174—89)

My present invention relates generally to surgical instruments, and has particular reference to a surgical electrode.

The type of electrode to which my invention has particular reference is one which is adapted to conduct alternating current of high frequency and transmit the same to body tissue to be treated, usually within the confines of a body cavity. By the use of a proper and suitable type of alternating current, the nature of which will be understood by those skilled in the art, the application thereof to body tissue can be made to produce either a coagulation or "cooking" of the tissue, or, where desired, an effect which permits dissection, resection, or cutting in general.

While the general effects of alternating currents of high frequency, applied in the manner mentioned, are not fully understood at the present time, it seems probable that the coagulative effect is caused by the generation of heat sufficient to boil at least part of the inherent moisture within the body tissue, the latter being thereby virtually cooked. This cooking is unaccompanied by any carbonization of the tissue and has the highly advantageous effect of rendering the tissue hemostatic.

Where the current is used for cutting purposes, the electrode is attenuated in such a manner that the concentration of current at the line of contact between the electrode and the tissue contacted thereby is sufficient to generate a spark or sparks which seem to produce an immediate and rapid coagulation, followed by a breakdown of the tissue itself. Accordingly, if the tool is properly wielded and advanced through the tissue immediately behind the sparks which are produced, an effect is produced which is similar to that of an exceptionally sharp knife. Cutting operations of this character are practically bloodless and are highly advantageous because of the ability of whatever sear or coagulation is produced to heal with extreme rapidity and apparent ease.

Many of the difficulties confronting the operator, however, are due to the necessity for applying current of proper and suitable characteristics. In cutting, the current must be especially stable and the oscillations must be sustained under differing load conditions. In pure coagulation, the current which is applied must be such that sparking and consequent cutting will be prevented.

A general object of my present invention is to provide an improved electrode which is so designed that treatments of tissue, especially cutting thereof, by means of a high-frequency electric current, may be rendered safer, more expeditious, and more reliably bloodless.

Cutting operations of the character described, while essentially bloodless, are nevertheless frequently accompanied by hemorrhages of one sort or another. Customarily, this condition is remedied by the removal of the electrode and the application of clamps, whereupon the operator frequently touches the electrode to the clamps and thereby induces a coagulation at the area or areas contacted by the clamps.

It is a more specific object of my present invention to provide an electrode whose use dispenses entirely with the necessity for any withdrawal thereof, whether hemorrhages develop or not, as the cutting proceeds. More especially, I have provided an electrode which is so constructed that the operative head thereof may be employed, without withdrawal of the electrode, either for purposes of cutting or for purposes of pure coagulation.

Briefly, my invention resides in the provision of an electrode wherein an operative head has a plurality of arms, preferably two. One of the arms is attenuated so as to be usable to produce a cutting effect, and another arm is of generally bulbous nature, so that its use may produce a pure coagulative effect.

A feature of my invention resides in designing the several arms of the operative head in such a manner that one and the same current may be employed to produce the respective effects. As a result, my present electrode need not be withdrawn from use until the particular operation has been entirely completed in a wholly hemostatic manner; and the operator is not called upon at any time to make any tedious or difficult adjustments in the particular generator of alternating current which is being employed.

I achieve the foregoing objects, and such other objects as may hereinafter appear or be pointed out, in the manner illustratively exemplified in the accompanying drawing, wherein—

Figure 1:
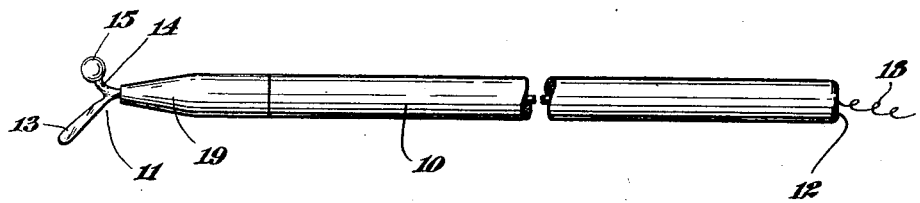
Figure 1 is a side view of an electrode constructed in accordance with the present invention, a portion being broken away for the sake of compactness.
Figure 2:
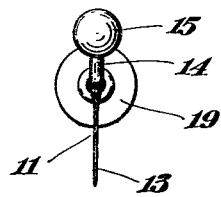
Figure 2 is an end view taken from the left of Figure 1.
Figure 3:
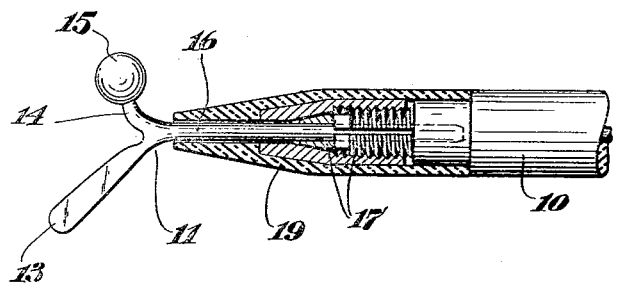
Figure 3 is an enlarged side view partly in section.

In the embodiment illustrated by way of example, I have shown an electrode which consists of a relatively elongated handle member 10 of insulating material, this member being adapted to be inserted into a body cavity. An operative head 11 is mounted on the inner end of the handle 10, and means are provided whereby the desired alternating current may be fed through the handle 10 from the rear end 12 thereof to the operative head 11.

In accordance with my present invention, the head 11 is provided with a plurality of branches or arms, and I have illustratively shown two. One arm 13 is relatively flat, elongated, and attenuated, so that the edge thereof may be employed for purposes of cutting tissue. The other arm 14 which I have illustrated is provided with an enlarged bulbous end 15 which is preferably substantially spherical in contour.

The arms 13 and 15 are so designed and proportioned that the same electric current, under the same conditions of generation thereof, may be employed to produce different effects. Thus, the arm 13 is so designed that the operative edge area thereof is sufficiently small to produce a cutting spark or sparks whenever the edge is brought into contact with the tissue to be cut. The size of the arm 13 is such that the cutting spark or sparks will be produced even when the cutting arm is inserted to its maximum extent into the tissue which is to be cut. Similarly, the arm 14 and the bulbous end 15 are so designed and proportioned that under the same current conditions, a purely coagulative and non-sparking effect will be produced whenever the bulbous arm is applied to the tissue.

The importance of properly designing the two arms of the electrode head in predetermined relationship to one another will be more fully appreciated when it is borne in mind that the desired advantages and effects would not be produced under other conditions. Thus, if the edge area of the arm 13 is too small the electrode would become unduly heated because of the extreme current concentration. By the same token, if the edge area is too great, the desired cutting spark would not be produced with the desired stability thereof. Furthermore, if the bulbous arm is made too large, coagulation might not be achieved; and if it were made too small, there would be danger of inducing the formation of sparks which would have a cutting effect and which would certainly not be conducive of hemostasis.

Although, from certain aspects, my invention is not restricted to any specific form of construction, I have found an electrode of the character herein illustrated to be highly advantageous from the standpoint of manufacture and reliable use. I prefer to mount the arms 13 and 14 upon a rearwardly extending stem 16 adapted to be engaged within an axial bore through the longitudinally split, exteriorly threaded neck 17. This neck is formed upon the forward end of the main or body portion of the handle 10, and is of conductive material electrically connected through the handle 10 with a suitable binding post (not illustrated) carried within the rear end of the handle 10. Suitable electrical connection can be made in any preferred and well known manner with such binding post, as indicated diagrammatically at 18. Applicable over the threaded neck 17 is the forwardly tapered handle portion 19 whose exterior diameter, at the rear, is the same as that of the body portion of the handle 10 so that when the entire electrode is assembled a smooth contour is produced. The portion 19 has a bore therethrough adapted to accommodate the stem 16, and rearwardly of this bore I provide an interiorly threaded portion adapted to engage with the threads on the neck 17. This interiorly threaded portion is slightly tapered, so that when the portions of the handle are screwed together, the split sections of the neck 17 will engage frictionally and snugly around the rear end of the stem 16 and thereby hold the operative head in proper position.

When the sections of the handle are unscrewed and separated from each other, the head 11 may be withdrawn forwardly, and this provides an efficient means for sterilizing the same, as well as for interchangeability of operative heads, if desired.

When my present electrode is used, the generator of alternating current, of whatever nature it may be, is adjusted in such a manner that a cutting spark will be generated in the desired way at the operative edge of the arm 13. The formation of this spark permits the electrode to be wielded in such a manner that the arm 13 is caused to follow behind the spark, and any desired incision or cut may thus be accomplished. While this procedure, as hereinbefore stated, is essentially hemostatic, resulting in the production of a sort of sear which automatically prevents bleeding, it frequently happens that the portions of the tissue which are being cut continue to bleed after the cutting has been accomplished. Should this occur, the operator merely turns the electrode, in situ, and applies the bulbous end 15 to the point of bleeding. Apart from any electrical effect that may be produced, it is obvious that this bulbous arm provides an immediate mechanical plug for the source of bleeding. The immediacy with which this may be accomplished is of extreme importance and value because no opportunity is thereby afforded for any more serious hemorrhage to develop. Furthermore, the application of the bulbous arm in the manner described produces an immediate coagulative effect, unaccompanied by any sparking whatsoever, as a result of which the tool may be almost immediately rewielded in the normal manner to proceed with the desired cutting operation.

Because of the predetermined relative design of the two arms of the operative head, no adjustments whatsoever to the source of alternating current are required, a procedure which under other circumstances is sometimes a difficult and time-consuming one.

After the desired dissection or resection has been accomplished, the tool is withdrawn, and the operation is thereby entirely completed without any necessity for further treatments involving the application and/or removal of clamps or the like. The use of my electrode thereby results not only in a great saving of time and effort, but it also permits the field of operation to remain clear of extraneous instruments and the like; it avoids traumatism that may be due to the use of clamps or the like; and it accomplishes the desired results in a rapid and expeditious manner with a minimum of sloughing.

In general, it will be obvious that changes in the details herein described and illustrated for the purpose of explaining the nature of my invention may be made by those skilled in the art without departing from the spirit and scope of the invention as expressed in the appended claim. It is therefore intended that these details be interpreted as illustrative, and not in a limiting sense.

Having thus described my invention, and il- lustrated its use, what I claim as new and desire to secure by Letters Patent is—

An electrode for application of high-frequency electric current to body tissue, comprising an insulated handle, an electric terminal at the rear end of the handle adapted to be connected to a single source of high-frequency current, a conductor extending forwardly through the handle from said terminal, and a conductive operative head at the forward end of said handle comprising a rearward stem extending into the handle and into electrical connection with said conductor, and two forwardly branching arms on said stem; one of said arms being sufficiently attenuated so as to produce cutting sparks when applied to tissue, yet sufficiently large to prevent melting under the current concentration effected thereby, the other arm being sufficiently large in area to prevent sparking when applied to said tissue, yet sufficiently small to concentrate enough of said current for producing a coagulative effect upon said tissue, said arms being thereby adapted to be used selectively with the same electric current fed thereto.

FREDERICK CHARLES WAPPLER.